United States Patent [19]

Bivin

[11] Patent Number: 4,624,588
[45] Date of Patent: Nov. 25, 1986

[54] FULL FIELD MICR ENCODER

[75] Inventor: Ken L. Bivin, Seattle, Wash.

[73] Assignee: Maverick Microsystems, Inc., Seattle, Wash.

[21] Appl. No.: 549,818

[22] Filed: Nov. 8, 1983

[51] Int. Cl.$^4$ .............................................. B41J 5/00
[52] U.S. Cl. ................................... 400/105; 400/154; 400/157.2; 400/174; 400/210; 400/225; 400/232; 400/304; 400/636; 400/642; 400/708
[58] Field of Search ............... 400/103, 104, 105, 106, 400/107, 108, 154, 154.4, 154.5, 155, 155.1, 157.1, 157.2, 157.3, 171, 174, 175, 210, 225, 232, 304, 306, 612, 636, 642, 708; 101/93.14, 93.05, 48; 226/195

[56] References Cited

U.S. PATENT DOCUMENTS

| | | | |
|---|---|---|---|
| 3,254,373 | 6/1966 | Pannill, Jr. et al. | 226/195 X |
| 3,401,783 | 9/1968 | Norwood et al. | 400/232 |
| 3,645,371 | 2/1972 | Jovis | 400/105 |
| 3,831,731 | 8/1974 | Mack et al. | 400/155 X |
| 3,845,709 | 11/1974 | Gardiner | 101/93.14 |
| 3,964,384 | 6/1976 | Johnston | 101/93.48 |
| 3,981,236 | 9/1976 | Johnston et al. | 101/93.48 X |
| 4,014,258 | 3/1977 | Wassermann | 101/93.48 X |
| 4,037,532 | 7/1977 | Plaza et al. | 400/157.2 X |
| 4,044,883 | 8/1977 | Boehmer | 400/225 X |
| 4,056,183 | 11/1977 | Beery | 400/636 X |
| 4,062,285 | 12/1977 | Deetz et al. | 101/93.48 X |
| 4,069,755 | 1/1978 | Beery | 101/93.05 X |
| 4,078,485 | 3/1978 | Guthrie | 400/157.2 X |
| 4,155,842 | 5/1979 | Wallace et al. | 400/636 X |
| 4,189,997 | 2/1980 | Nozaki et al. | 101/93.48 X |
| 4,212,549 | 7/1980 | Edwards et al. | 400/154 |
| 4,217,055 | 8/1980 | Moon | 400/171 X |
| 4,243,330 | 1/1981 | Wallace et al. | 400/636 X |
| 4,255,061 | 3/1981 | Beery | 101/93.05 X |
| 4,258,622 | 3/1981 | Estrabaud et al. | 400/154.5 X |
| 4,401,026 | 8/1983 | Brown | 101/93.48 X |
| 4,405,246 | 9/1983 | Suzaki | 400/157.2 X |

FOREIGN PATENT DOCUMENTS

| | | | |
|---|---|---|---|
| 0022340 | 1/1981 | European Pat. Off. | 101/93.48 |
| 0054583 | 5/1981 | Japan | 400/210 |
| 2026392 | 2/1980 | United Kingdom | 400/636 |

OTHER PUBLICATIONS

IBM Technical Disclosure Bulletin, "Speed Enhancement to Check Inscriber", Tulp et al, vol. 26, No. 8, Jan. 1984, pp. 3982–3983.

Primary Examiner—Ernest T. Wright, Jr.
Attorney, Agent, or Firm—Bruce A. Kaser

[57] ABSTRACT

A check encoder (11) for printing of full field MICR (Magnetic Ink Character Recognition) codes on checks, includes a check guide (19) and means for sensing the position of the check (25,27) in the check guide (19). A pair of fixed roller assemblies (29,31), coact with a pair of movable roller assemblies (33,35) to grip the check and move the check under the action of a stepper motor (44) to an initial known position. A hammer (87), mounted in a hammer mount (83) and activated by an electrical solenoid (91) impacts the check against successive selected characters on a font wheel (61) to print the desired MICR code. A computer program, controls the operation of the check positioning, check encoding and check moving operations. When the desired MICR code has been printed on the check, the check is moved out of the encoder (11) by means of the fixed and movable roller assemblies (29,31,33 and 35).

10 Claims, 8 Drawing Figures

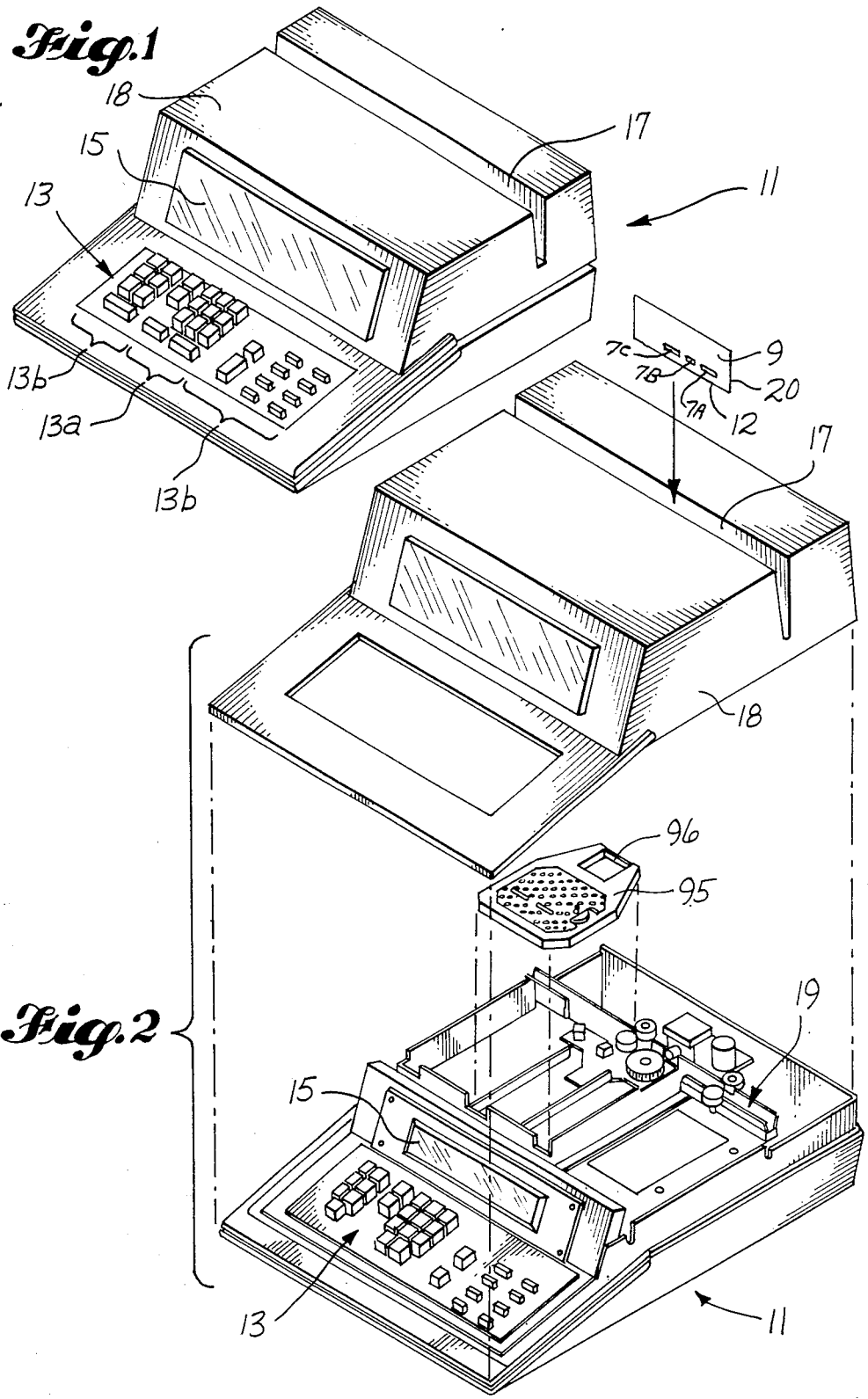

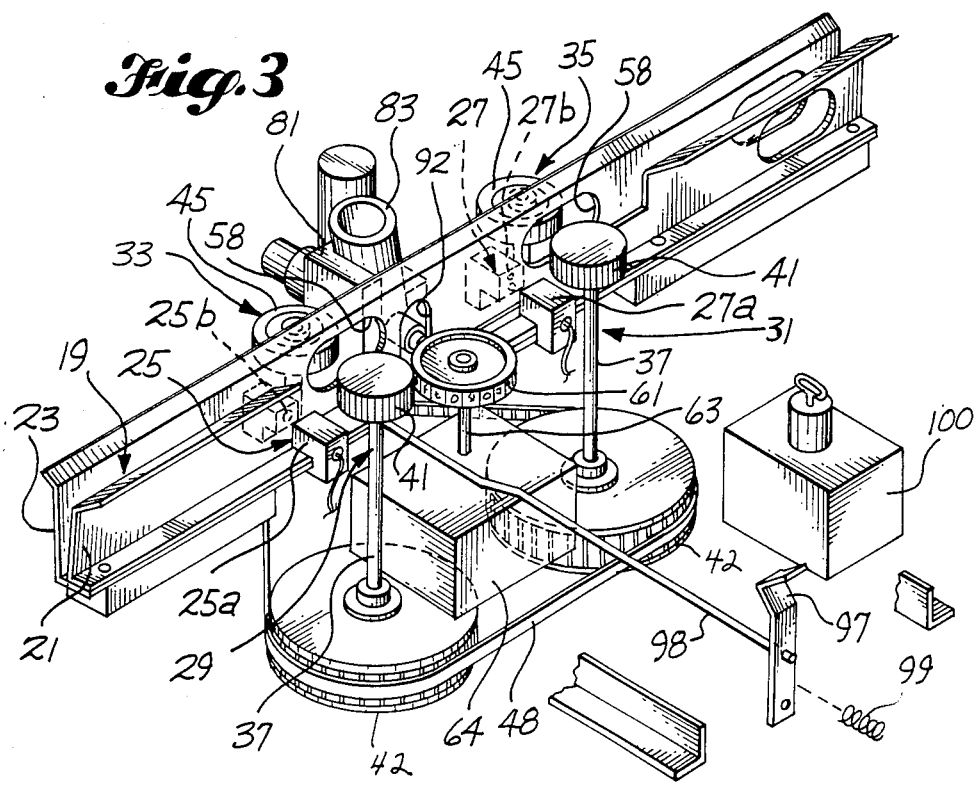
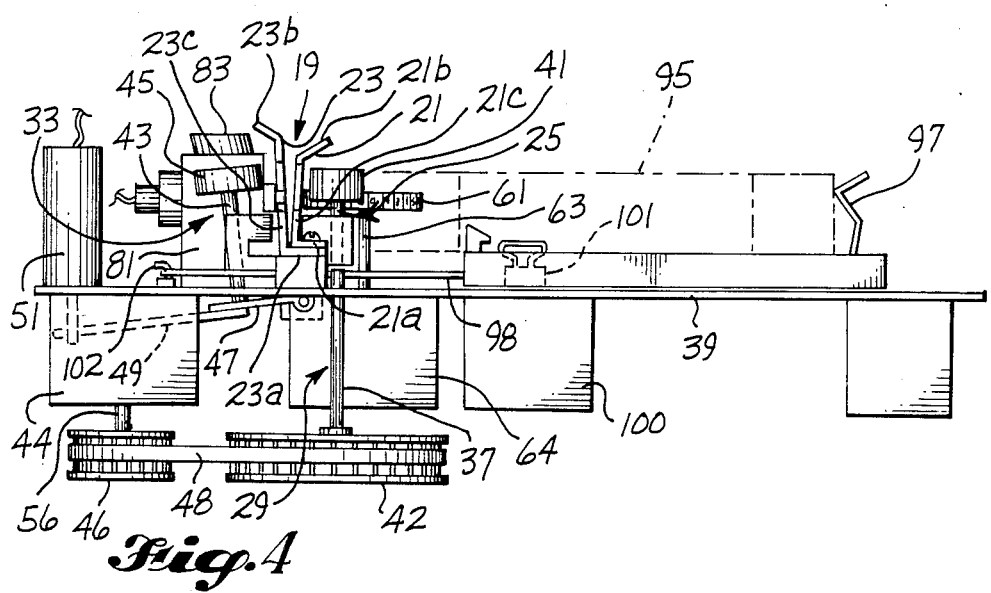

FULL FIELD MICR ENCODER

DESCRIPTION

1. Technical Field

This invention relates generally to the art of check encoders, and more particularly concerns a programmable, electronically controlled MICR (Magnetic Ink Character Recognition) check encoder.

2. Background of the Invention

With the wide acceptance of MICR printing technology in the banking industry, machines have been developed to print the desired MICR code on individual checks, including certain machines which are typically used on the premises of the banks themselves. The older machines are quite large, mechanically controlled, somewhat difficult to set up, and cumbersome to use. These mechanical encoding machines are still in wide use throughout the banking industry, although they are now being gradually displaced by new machines which include a substantial amount of electronic components. Even these new machines, however, are still relatively large, and include a substantial amount of mechanical components which are rather difficult to adjust. The machines also require a technician at the facility of the manufacturer to program them to operate in accordance with the user's needs. The lack of programming capability in the field is a significant limitation on the new machines.

The need for a compact, conveniently programmable, easy-to-operate encoding machine, both in the banking industry and in other retail industry, is increasing significantly, since MICR information is now typically also printed on the check after the check has been written. When this is done by retail businesses, the result is faster clearance of checks and in many cases, compensation by the banks.

Accordingly, it is desirable to provide a compact MICR check encoder which is reliable and easy to operate, requiring relatively little counter space, as well as being conveniently programmable in the field, so that a manager or other individual at the bank branch or retail business may program the encoder to print desired information on a check as well as perform other desired processing functions, without extensive training.

CROSS REFERENCE

Reference is hereby made to a michrofiche appendix, comprising 2 microfiche, with a total of 162 frames. The microfiche appendix is in the file of a copending application having the same title, description and drawings, and filing date as this application, in the name of Ken L. Bivin and Wayne Albin, Ser. No. 06/549,817, now abandoned.

DISCLOSURE OF THE INVENTION

Accordingly, the present invention is directed to an apparatus for receiving, transporting and encoding checks, the apparatus being useful in a check encoder, comprising means for receiving a check from above the check receiving means; means for positioning the check in a selected position in the check receiving means prior to the time that encoding (printing of a code) of the check is to begin; means for encoding the check, the check encoding means being located with the check receiving means, so that the check is inserted into the apparatus in the immediate vicinity of the check encoding means; and means for moving the check in said check receiving means so that it may be properly positioned for encoding of successive characters thereon.

BRIEF DESCRIPTION OF THE DRAWINGS

FIG. 1 is a schematic view of the apparatus of the present invention.

FIG. 2 is a schematic view of the apparatus of FIG. 1, showing the top cover and the ribbon cartridge in an exploded position.

FIG. 3 is a schematic view showing the check guide, check transport and check encoding portions of the apparatus of FIG. 1.

FIG. 4 is a side elevational view of the apparatus of FIG. 3.

BEST MODE FOR CARRYING OUT THE INVENTION

Figure 5:
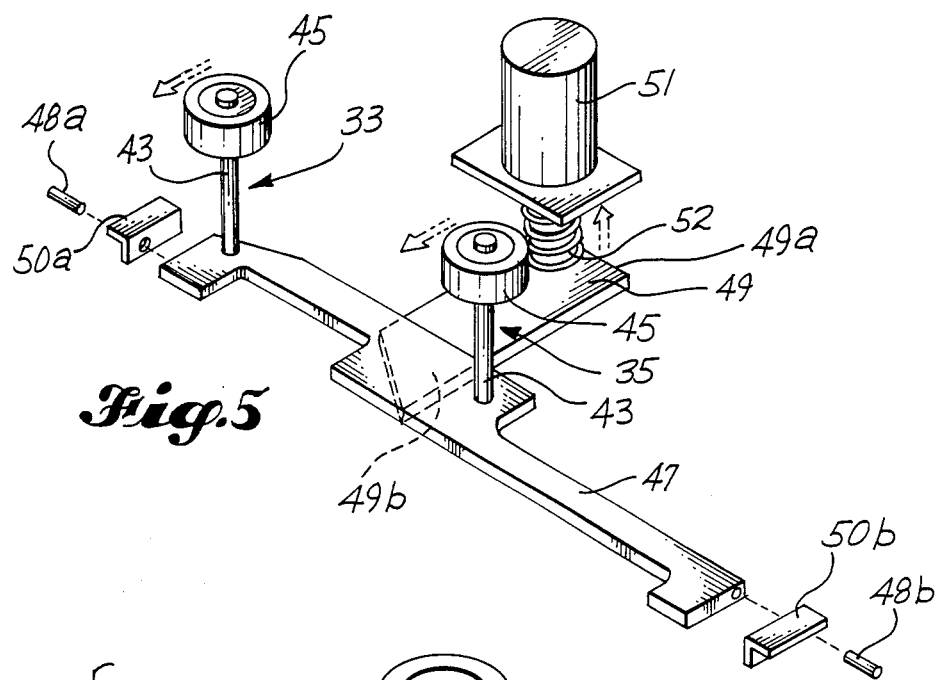
FIG. 5 is a schematic view showing a portion of the check gripping system positioned to the rear of the check guide portion of the apparatus of FIG. 3.

FIGS. 1 and 2 show schematic views of the preferred embodiment of the check encoder of the present invention. The encoder is compact, electronically controlled and programmable. It is designed and sized to be used conveniently at a conventional teller's station, or at a new accounts' desk in a bank.

The encoder, shown generally at 11 in the drawings, is in operation programmed to print a full field MICR code on a conventional bank check 9 (shown prior to encoding) through a keyboard 13. The check 9 may be conventional size ($2\frac{3}{4}"\times 6"$) or other sizes. The keyboard 13 includes a conventional 10 key numeric pad 13a which can, if desired, accept alphabetic input, as well as a number of special symbol or function keys 13b. The keyboard 13 is the user interface with the software and follow-on elecronic portions of the apparatus, which in turn operate the mechanical assemblies.

The keyboard 13 is designed to provide a relatively sophisticated but convenient programming input capability for the encoder 11. Many check processing functions can be programmed by means of the keyboard 13. Further, several separate machine functions can be stacked or sequenced together by one keystroke, through the available programming capability. The software control of the encoder 11 is arranged so that the programming of the encoder 11 can be typically accomplished by a manager or other person located in the bank branch or other retail establishment, without the need of sophisticated training. Thus, the present encoder 11 has an extensive field programming capability which can be fully utilized by customer personnel at the location of the encoder.

The MICR code which is to be printed on the check 9 typically comprises 3 numerical fields 7a, 7b, 7c (shown as rectangular blocks since the check 9 has not yet been encoded), each separated by a space. The first field 7a (from right to left on the check) comprises 12 character positions, indicating the amount of the check. The second field 7b comprises 18 character positions, indicating the full account number. The third field 7c comprises 11 character positions identifying the transit number for the bank.

The information programmed into encoder 11 by the operator through keyboard 13 is shown on a display 15, which in the embodiment shown is a commercially available vacuum fluorescent display connected in a conventional manner. Display 15 is a dot matrix display so that symbols and foreign languages, as well as conventional alpha-numeric characters, can be shown on the display 15.

After encoder 11 has been programmed in accordance with the desires of the user, including the selected MICR code, as confirmed on display 15, a check 9 is dropped into a check guide opening 17 in the cover 18 of the encoder, opening 17 being located toward the rear of encoder 11. A check guide 19, into which the check 9 drops, is shown generally at 19 in FIGS. 2–4. Guide 19 extends the full width of the encoder 11, and in the embodiment shown is in the form of a narrow trough, comprising front and back sections 21 and 23, which are joined together at their respective lower edges to form a trough with a narrow, flat bottom. The guide 19 in the embodiment shown is approximately 1½ inches high so that when an inserted check 9 rests on the bottom of the guide 19, approximately 1½ inches of the check 9 extends above the top of the guide 19.

The back section 23 of check guide 19, in the embodiment shown, includes an arrow horizontal base portion 23a which extends forwardly of the remainder of back section 23, an intermediate, substantially vertical portion 23c, and a top portion 23b which flares backwardly and at an angle from the remainder of back section 23. Front section 21 has a base portion 21a, with portion 21a resting on top of and being secured to base portion 23a of back section 23. An intermediate section 21c is similar to portion 23c of back section 23, while a top portion 21b flares forwardly and at an angle relative to the remainder of front section 21.

Back and front sections 23 and 21 gradually diverge from each other from bottom to top in the embodiment shown. At the bottom of the two sections 23, 21, they are separated by approximately 1/16th inch, while at the top, they are separated by a slightly greater distance. The check 9 thus may be easily inserted by the operator into the check guide 19. The back section 23 is slightly higher than front section 21, to further facilitate insertion of the check 9 into guide 19.

The front and back sections 21 and 23 of check guide 19 both are cut out in several areas, to accommodate various portions of the encoder 11 which operate on the check 9, all of which are described in more detail hereinafter.

As will become evident, the configuration of the guide 19, and the arrangement of the check-sensing system, the check transport system and the check printing system are all significant because the check 9 is essentially dropped directly into the printing mechanism, instead of being inserted into an off-line guide and then being clamped and guided into the printing mechanism.

The check sensing system provides the information by which the check 9 is initially properly positioned for encoding. Positioned at the bottom of the guide 19 approximately 2¾ inches apart are two conventional infrared sensor assemblies 25 and 27. Sensor 25 comprises one infrared light source 25a and a light detector 25b, on opposite sides of the check guide 19, while sensor 27 includes a pair of light sources 27a and detectors 27b, one pair being slightly elevated to detect the leading edge 20 of the check 9.

When a check 9 is dropped into guide 19, approximately in the middle of the guide 19, sensors 25 and 27 sense the proper seating and position of the check 9. Sensor 25 and the bottom edge sensor pair of sensor 27 check the bottom edge 12 of the check 9. Once the bottom edge 12 is determined to be seated properly, as determined by the condition of sensor 25 and the bottom edge sensor pair of sensor 27, the check moving system, which positions the check 9 lengthwise, and the printing system are enabled. If the check 9 is not seated properly, then the moving and printing systems are not enabled. The operator will then remove and re-insert the check 9.

When the check 9 is properly seated in guide 19, as determined by sensors 25 and 27, the check is gripped by the check transport (moving) system shown generally in FIGS. 3–5. The check transport system includes two fixed roller assemblies 29 and 31 positioned slightly to the front of check guide 19 and two movable roller assemblies 33 and 35 positioned slightly to the rear of the check guide 19.

The fixed roller assemblies 29 and 31 are positioned approximately 3¼ inches apart, slightly forwardly of front section 21 of check guide 19. Each fixed roller assembly 29, 31, such as for instance roller assembly 29, includes a vertical mount rod 37 which extends through a horizontal support plate portion 39 of encoder 11. The mount rod 37 has a length of 3¼ inches in the embodiment shown. At the top of mount rod 37 is a serrated roller 41, which in the embodiment shown is made of steel and has a diameter of approximately ⅝th inch and a height of approximately ½ inch.

The edge of the serrated roller 41 is at is nearest point almost adjacent the front surface of front section 21 of check guide 19. The top of serrated roller 41 is approximately 1⅜ inches above support plate 39, while mount rod 37 extends below support plate 39 approximately 1¾ inches. At the bottom end of rod 37 is a pulley 42. Roller 41, rod 37 and pulley 42 rotate together. A stepper motor 44 has a pulley 46 secured to its driveshaft 56. Pulley 46 is in the same plane as the pulley 42 on the mounting rods 37 of the respective fixed roller assemblies 29 and 31. A drive belt 48 connects the three pulleys 46, 42.

Each movable roller assembly 33, 35, such as roller assembly 33 for example, includes a mount rod 43 and a rubber roller 45 which is mounted at the top of mount rod 43. Roller 45 in the embodiment shown is nonmetal, of molded polyurethane, approximately 1 inch in diameter and approximately ½ inch high. Mount rod 43 is connected to a mounting plate 47 which in turn is mounted on opposing end pins 48a and 48b which rotate in fixed end mounts 50a, 50b. The fixed end mounts 50a, 50b are attached to the support plate 39 of the encoder 11.

Mounting plate 47 rotates about a horizontal axis, so that the respective rollers 45 on the movable roller assemblies 33, 35 move toward and away from the back section 23 of check guide 19. Mounting plate 47 is rotated by means of a link plate 49 and a solenoid 51. The solenoid 51 is conventional, and when activated by an electrical signal, draws one end 49a of link plate 49 upwardly against the bias of spring 52. The other end 49b of link plate 49 is connected to the center of mounting plate 47, so that when the one end 49a of link plate 49 is moved upwardly, the polyurethane rollers 45 move toward check guide 19, through cutout portions 58 in the back section 23 sufficiently that the check is captured or gripped between serrated rollers 41 and polyurethane rollers 45. When the movable roller assemblies 33 and 35 are in this position, the check is held securely, so that it may be transported.

When the check is to be released, the solenoid 51 is deactivated, and spring 52 moves the one end 49a of link plate 49 downwardly, resulting in the movable rollers 45 moving away from check guide 19, and the check being released.

After the check is gripped by the check holding means, as described above, the check may be transported horizontally in the check guide 19 by energizing stepper motor 44. When stepper motor 44 is energized, pulley 46 turns, which results in pulleys 42 being turned by means of drive belt 48. This results in turning of rollers 41, which causes the check to move. The use of a serrated edge of hard material such as steel for the fixed but rotatable rollers 41 in combination with a molded polyurethane for the movable rollers 45 has been found by the inventor to provide a reliable and advantageous means of transporting the check 9 in the check guide 19 accurately without tearing or crumpling the check, so as to permit high quality printing on the check.

When the check 9 has been properly seated in the check guide 19, and the check has been gripped, the check is transported initially toward the left hand side of the encoder 11 until the right hand or leading edge 20 of the check passes by the elevated pair of light sources 27a and detectors 27b in sensor 27. The true position of the check relative to the fixed print means is then known. This is the base position for the check. The check is further transported under programmed instructions either right or left to the first character position in the desired field to be printed, in which position actual printing of the check begins.

In printing, the check is moved by the transport system from left to right, while the print mechanism remains fixed in position. The print mechanism is shown in FIGS. 3-4 and 6-8. The print mechanism includes a font wheel assembly which includes a font wheel 61, which is mounted on the motor shaft 63 of a stepper motor 64, which in turn is positioned on the underside of support plate 39. Font wheel 61 in the embodiment shown has 16 character positions on its edge surface, with the respective characters arranged as shown in FIG. 7.

The two most common characters, i.e. the character symbol for "amount38 and the "zero38 character appear twice on the font wheel 61, the symbol for "amount38 appearing at positions 1 and 9, which are 180 degrees apart, while the zero character appears at positions 2 and 10, also 180 degrees apart. This arrangement has the advantage of increasing the speed of the printing of the check 9, as the font wheel 61 will move to the closest position for those two symbols.

In operation, the stepper motor 64, controlled by electrical signals, rotates font wheel 61 through motor shaft 63, to which the font wheel 61 is connected by a roll pin 62. The font wheel 61 is rotated the shortest distance until the character to be printed is in the print position relative to the check.

Figure 6:
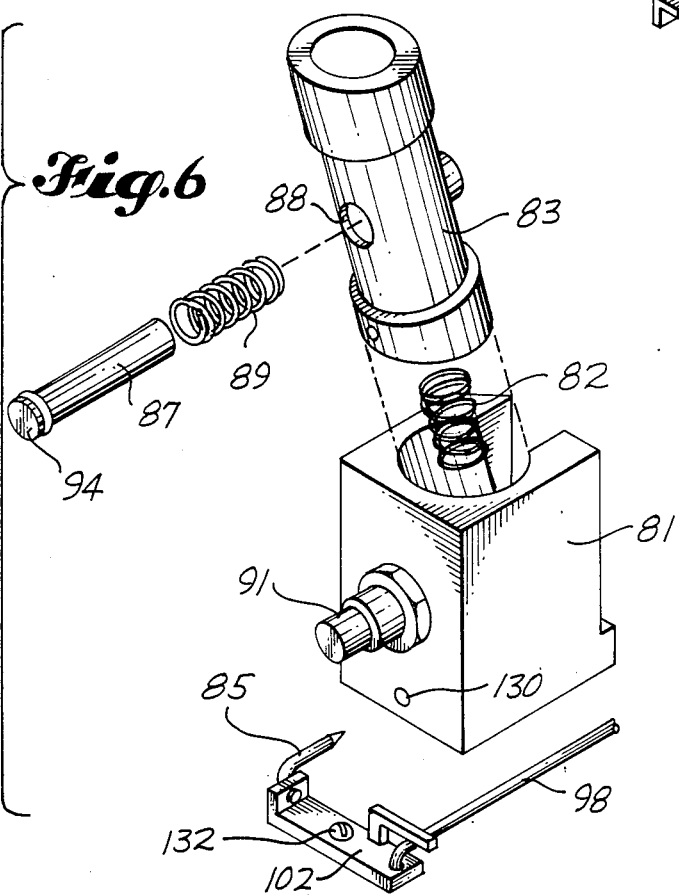
FIG. 6 is an exploded view showing the portion of the check encoding means which is positioned to the rear of the check guide.
Figure 7:
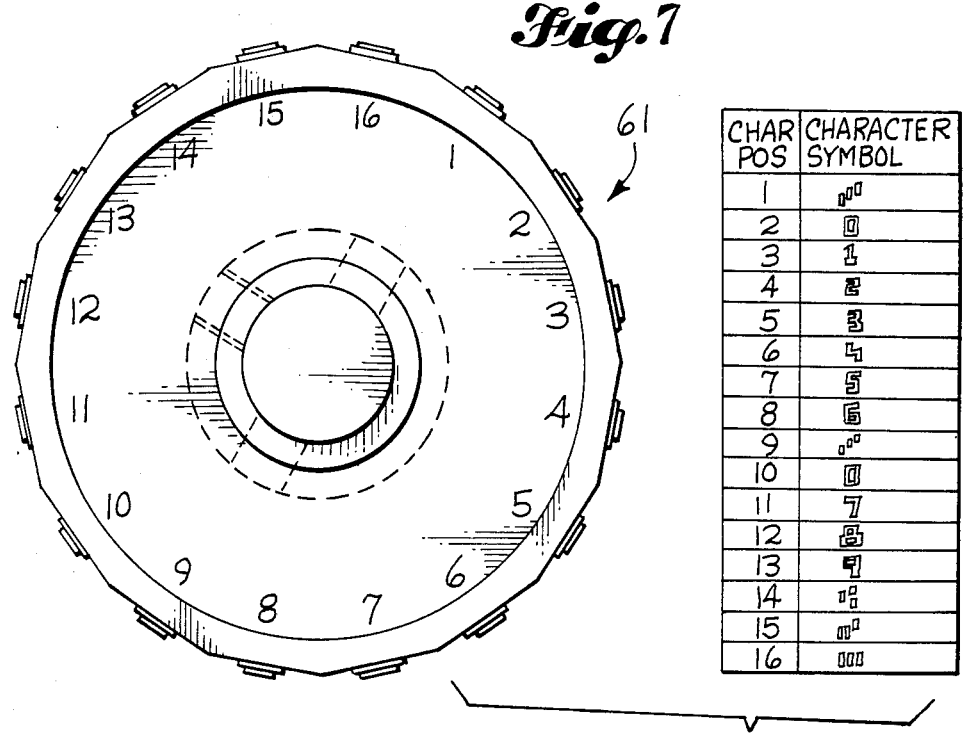
FIG. 7 is a top view of the font wheel of the apparatus of FIG. 1 and further shows a chart of the characters on the font wheel.
Figure 8:
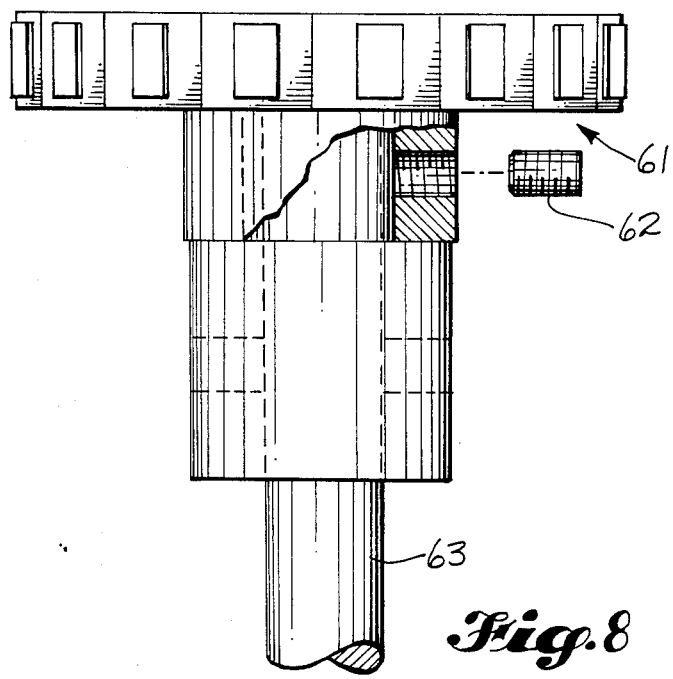
FIG. 8 is an elevational view, partially cut away, of the font wheel of FIG. 7.

The portion of the print assembly which is positioned to the rear of check guide 19 is shown in FIGS. 3, 4 and 6. This portion includes an assembly mounting block 81 which is secured to support plate 39. In the assembly mounting block 81 is positioned a cylindrical hammer mount 83. Hammer mount 83 is held in the assembly mounting block 81 by means of a pin 85. When pin 85 is removed, hammer mount 83 is moved upwardly from mounting block 81 by the action of a spring 82 beneath hammer mount 83. Hammer mount 83 is generally cylindrical, but has a slightly larger diameter at both ends than the center portion, and in the embodiment shown is 1 inch in diameter and $2\frac{1}{4}$ inches long. A hammer element 87 is positioned horizontally in hammer mount 83, in opening 88. Hammer element 87 is retained in hammer mount 83 and biased in a rearward position by means of a spring 89 which fits in opening 88 in hammer mount 83.

In the embodiment shown, the hammer element 87 is a delrin rod, 1 inch long and 3/16 inches in diameter. Hammer element 87 is positioned such that when it is activated, it quickly moves horizontally through an opening 92 in the back section 23 of the check guide 19, pressing the check 9 against font wheel 61. A ribbon 96 in a ribbon cartridge 95 is positioned between the check 9 and the font wheel 61 and provides the ink for the printing of the character, as more fully described hereinafter. The use of a delrin rod as a hammer element 87 is advantageous, since because of its relatively light weight, there is no resulting indentation (embossing) of the check, which is an undesirable result of the printing mechanism of conventional check encoders.

In the embodiment shown, hammer element 87 is moved forwardly under a high impact pressure by means of a solenoid 91 which acts against the rear end 94 of hammer element 87. When the solenoid 91 is energized and strikes the hammer element 87, the hammer element 87 first moves forward at a high speed against the action of spring 89, so that the front end 94 of hammer element 87 presses the check against the font wheel 61. The spring 89 then returns hammer element 87 rearwardly to its original position.

The print quality is adjusted by changing the pulse width of the signal applied to solenoid 91 and by controlling the position of the font wheel 61. If darker print is desired, the pulse width of the electrical signal controlling the solenoid 91 can be increased. This increases the speed of the hammer element 87. If the print quality is uneven in the same character, the rotational position of the font wheel 61 may be varied in very small increments, so that the hammer element 87 strikes the font character evenly. Also, the alignment of the printed character on the check may be varied. Th stepper motors 44, 64 used in the embodiment shown are 1.8 degree step size motors, which, with software and electronic control further dividing each step into 8 mini-steps, provides a high resolution of movement, and hence very good control over print quality and other operations of the apparatus.

The adjustment of the timing and phasing of the electrical signals controlling the stepper motors 44, 64 is accomplished through the software, from instructions provided through keyboard 13. These adjustments optimize the changes in the speed of the motors 44, 64 as well as settling time. The motors 44, 64 can be energized at any current level in either direction. Two quasi - sin waves, 90 degrees out of phase, are used to energize the motors 44, 64. With digital timing/phasing control provided by the software, unifom acceleration and deceleration of the speed of the motors 44, 64 is possible, moving up to and then down from a maximum velocity without the oscillations normally caused by stepping of electrical signals. Thus, the velocity of each motor 44, 64 increases and decreases as a ramp function. This technique can be used to increase the speed of printing; however, the technique is accomplished on an empirical basis.

In the embodiment shown, the ink for the printing of the characters is provided by the ribbon 96, which is housed in the cartridge 95, shown in FIG. 2. The cartridge 95 itself is conventional and is commercially available. Cartridge 95 is removable and is positioned on the upper surface of support frame 39 with its back edge against a retaining clip 97, which is otherwise biased forwardly by spring 99. The ribbon 96 is moved with each new character to be printed by stepper motor 100, which acts on the cartridge 95 through a drive element 101 in conventional fashion. A clean portion of ribbon 96 is thus presented between the font wheel 61 and the hammer element 87 for each character printed. When the ribbon 96 is completely used, i.e. when the ribbon 96 has been run through once, the old cartridge 95 is removed and a new cartridge 95 is inserted.

Conventional encoders use a pancake reel-to-reel ribbon. Cartridge ribbons have not been used heretofore because the reel ribbons have been able to print a greater number of characters without changing the ribbon. In the present invention, however, the ribbon 96 is advanced a particular distance for each successive character to be printed, the distance depending on the width of the next successive character, rather than a fixed distance. Prior to each character being printed, and hence prior to the ribbon 96 being advanced for the next character, the width of the next character is determined and the ribbon 96 is accordingly advanced sufficiently to result in a fixed distance between the trailing edge of the previous character printed and the leading edge of the next character. This results in substantial savings in the use of the ribbon 96.

Conventionally, the ribbon 96 is advanced a set distance for each character, which actually results in a varying distance between each character, because the actual width of the characters are different. With the disclosed system, a cartridge ribbon 96 can produce as many characters as a conventional pancake-type ribbon arrangement. Thus, with the disclosed system, changing a ribbon 96 is very convenient, unlike conventional encoders.

In the embodiment shown, the removal of the ribbon cartridge 95 has the effect of releasing pin 85, so that hammer mount 83 is released and pops up when the cartidge 95 is removed. In this position of the hammer mount 83, the delrin rod hammer element 87 used in the embodiment shown may be conveniently replaced by turning the element 87 to release it from the mount 83. By replacing the hammer element 87 each time the ribbon cartridge 95 is replaced, high quality printing is maintained.

The mechanism for releasing pin 85 is shown in FIGS. 3, 4 and 6. A long horizontal rod 98 connects retaining clip 97 and one end of a rotatable tab element 102. Tab element 102 is positioned to the rear of assembly mounting block 81, and rotates in a horizontal plane about a pivot 132 on the upper surface of support plate 39. When ribbon cartridge 95 is removed, spring 99 moves retaining clip 97 such that rod 98 moves to the rear, rotating tab element 102 in a clockwise direction. This results in pin 85, which is connected to the other end of tab element 102, moving out of its slot 130 in mounting block 81, thus releasing hammer mount 83. When a new ribbon cartridge 95 is seated, its back against clip 97, against the bias of spring 99, tab element 102 is rotated counterclockwise, moving pin 85 into its slot 130 in mounting block 81, engaging hammer mount 83.

Thus, in summary of operation, a check 9 is dropped into the check guide 19, the apparatus initially positions each check 9 correctly in the check guide 19 and then prints each check from right to left, in accordance with programmed information which is shown on the display 15. In printing, check 9 is moved the desired distance, the font wheel 61 is rotated to present the desired character, the ribbon 96 in the cartridge 95 is moved the desired amount, and the hammer element 87 is actuated, printing the check.

The computer program (disclosed in microfiche appendix) controls what is to be displayed, what is to be printed on the check 9, including automatic check sequencing operations.

A compact MICR encoder 11 has been disclosed which is capable of being conveniently programmed in the field. The mechanical systems are arranged to be actuated and operated independently of each other, by virtue of the control portion of the encoder 11. Further, the mechanical systems are designed so that the check 9 is inserted into the check guide 19 substantially directly into the printing system. All of this results in a compact, reliable, operationally flexible encoder 11.

Although a preferred embodiment has been disclosed herein for illustration, it should be understood that various changes, modifications, and substitutions may be incorporated in such embodiment without departing from the spirit of the invention as defined by the claims which follow.

I claim:

1. A check encoder apparatus for receiving, transporting, and encoding checks, said encoder apparatus being electronically controlled by programmed instructions, and comprising:

a check guide having a base portion and an upwardly directed opening for feeding a check into said guide, whereby said check is fed into said guide from a position substantially above said guide;

means for sensing the position of said check after said check has been fed through said opening;

means for gripping said check, said gripping means being operatively positioned substantially between said feed opening and said base portion, wherein said gripping means is characterized in that said gripping means is operable between an open and a gripping condition, said gripping means being in an open condition when said check is fed into said guide, said gripping means being operatively connected to said sensing means, wherein said gripping means grips said check in response to a signal from said sensing means indicating that said check is properly seated adjacent said guide base portion, and further, said gripping means including two-way drive means for moving said check to a predetermined base position, wherein such position is identified by said sensing means, and after such identification, said two-way drive means is operable to move said check from said base position a preselected distance right or left along said guide base portion, in accordance with electronically programmed check position instructions, and wherein said two-way drive means of said gripping means further includes a fixed roller assembly having at least one roller drivingly connected to a reversible motor, and wherein said gripping means further includes a movable roller assembly having at least one roller, said movable roller assembly being mounted to said check encoder apparatus for pivotal movement about a horizontal axis, so that when said gripping means is in said gripping condition said movable roller is substantially adjacent said fixed roller to grip said check therebetween, and wherein when said gripping means is in said open condition said movable roller is in a position pivoted away from said fixed roller, to permit said check to be fed into said check guide; and means for encoding said check after said check has been moved said preselected distance.

2. An apparatus of claim 1, wherein said fixed roller has a serrated edge surface, and wherein said movable roller has a smooth edge surface.

3. An apparatus of claim 2, wherein said fixed roller assembly includes two elevated metal rollers drivingly connected to said reversible motor, and wherein said movable roller assembly includes two elevated non metal rollers, the two rollers in each assembly being separated by a distance which is less than the length of a check.

4. An apparatus of claim 3, wherein said sensing means includes two check bottom edge sensors, separated by a distance which is less than the length of a check, and a check leading edge sensor.

5. An apparatus of claim 4, wherein said encoding means comprises:

a font wheel means positioned on one side of said check guide, means for moving said font wheel means to access a selected printing character located thereon for printing, and hammer means located on the other side of said check guide for impacting against said font wheel means, and means for actuating said hammer means.

6. An apparatus of claim 5, including:

a removable cartridge containing a ribbon, said ribbon in operation advancing between said font wheel means and said hammer means, and means mounting said hammer means to said check encoder apparatus in a manner so that said hammer means is released from said mounting means when said cartridge is removed from said apparatus.

7. An apparatus of claim 6, wherein said font wheel means has a redundancy of at least one character, the redundant characters being separated by approximately 180°.

8. An improved apparatus for receiving, transporting, and encoding checks, said apparatus including a font wheel and a hammer for printing a code on checks, comprising:

a cartridge containing a ribbon, said cartridge being removable from said apparatus;

means mounting said hammer to said apparatus, said mounting means connecting said hammer to said cartridge in a manner so that said hammer is released from said apparatus when said cartridge is removed from said apparatus.

9. An apparatus of claim 8, wherein said hammer includes an elongated body, a mount for said hammer, and an assembly in which said hammer mount is positioned, said hammer mount being removable from said hammer assembly and said hammer body being removable from said hammer mount.

10. An apparatus of claim 9, wherein said hammer body comprises a lightweight plastic material, so that the check is not embossed by impact of said hammer against said font wheel.

* * * * *